US010914450B2

(12) United States Patent
Chang et al.

(10) Patent No.: US 10,914,450 B2
(45) Date of Patent: Feb. 9, 2021

(54) LAMP SHADE STRUCTURE AND LAMP

(71) Applicants: Radiant(Guangzhou) Opto-Electronics Co., Ltd, Guangdong (CN); Radiant Opto-Electronics Corporation, Kaohsiung (TW)

(72) Inventors: Cheng-Ang Chang, Kaohsiung (TW); Guo-Hao Huang, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 16/701,174

(22) Filed: Dec. 3, 2019

(65) Prior Publication Data
US 2020/0103090 A1  Apr. 2, 2020

Related U.S. Application Data

(63) Continuation of application No. PCT/CN2018/098341, filed on Aug. 2, 2018.

(51) Int. Cl.
*F21V 3/02* (2006.01)
*F21V 8/00* (2006.01)

(52) U.S. Cl.
CPC ............... *F21V 3/02* (2013.01); *G02B 6/005* (2013.01)

(58) Field of Classification Search
CPC ... F21V 3/02; F21V 1/00; G02B 6/005; F21Y 2103/33
See application file for complete search history.

(56) References Cited

U.S. PATENT DOCUMENTS

| 10,788,173 | B2* | 9/2020 | Nagami | F21S 2/00 |
| 2014/0340880 | A1* | 11/2014 | Benner | F21V 33/006 |
| | | | | 362/147 |
| 2015/0346413 | A1* | 12/2015 | Kadoriku | F21S 8/04 |
| | | | | 362/613 |
| 2016/0290605 | A1* | 10/2016 | Haskal | F21K 9/66 |
| 2017/0268733 | A1* | 9/2017 | Johnston | F21V 5/10 |
| 2018/0274751 | A1* | 9/2018 | Kennedy | F21V 7/09 |

FOREIGN PATENT DOCUMENTS

| CN | 2324398 Y | 6/1999 |
| CN | 2596187 Y | 12/2003 |
| CN | 102261617 A | 11/2011 |
| CN | 104654146 A | 5/2015 |
| CN | 205316245 U | 6/2016 |
| TW | 517145 B | 1/2003 |
| TW | 201400759 A | 1/2014 |
| TW | M487224 U | 10/2014 |

* cited by examiner

Primary Examiner — Evan P Dzierzynski
(74) Attorney, Agent, or Firm — CKC & Partners Co., LLC

(57) ABSTRACT

A lamp shade structure and a lamp are provided. The lamp shade structure includes a main body and light guide structures. The main body has a concave surface and an outer surface opposite to the concave surface. The light guide structures are disposed on the concave surface or the outer surface, in which each of the light guide structures has a central thickness and a peripheral thickness, and the central thickness is smaller than the peripheral thickness.

15 Claims, 15 Drawing Sheets

(8 of 15 Drawing Sheet(s) Filed in Color)

LAMP SHADE STRUCTURE AND LAMP

RELATED APPLICATIONS

This application is a continuation application of International Application No. PCT/CN2018/098341 filed on Aug. 2, 2018, which is incorporated herein by reference.

BACKGROUND

Field of Invention

The present invention relates to a lamp shade structure and its application. More particularly, the present invention relates to a lamp shade structure which can change light traveling path and generate special visual effect and a lamp using the lamp shade structure.

Description of Related Art

Lamps become more diversified to meet market requirements. One of conventional lamps uses a lamp shade structure covering its light source. Combinations of different light sources and lamp shade structures can provide multiple-choice to the consumers. However, most of lamp shade structures print different patterns or colors on their outer surface, such printed patterns or colors cannot effectively utilize light provided by the light source.

SUMMARY

The invention provides a lamp shade structure and its application to a lamp, in which the lamp can generate an aesthetically pleasing effect by using the lamp shade structure.

According to the aforementioned object, a lamp shade structure is provided. The lamp shade structure includes a main body and light guide structures. The main body has a concave surface and an outer surface opposite to the concave surface. The light guide structures are disposed on the concave surface or the outer surface, in which each of the light guide structures has a central thickness and a peripheral thickness, and the central thickness is smaller than the peripheral thickness.

According to an embodiment of the present invention, the light guide structures are disposed on the outer surface, and each of the light guide structures is a recessed structure which is recessed from the outer surface toward the concave surface.

According to an embodiment of the present invention, the light guide structures are disposed on the concave surface, and each of the light guide structures is a recessed structure which is recessed from the concave surface toward the outer surface.

According to the aforementioned object, a lamp is provided. The lamp includes a light guide plate, a light source and aforementioned lamp shade structure. The light guide plate has a light-incident surface and a light-emitting surface. The light source is disposed adjacent to the light-incident surface. The lamp shade structure covers the light guide plate.

According to an embodiment of the present invention, the light guide plate is an annular structure, and the light guide plate has an inner peripheral surface, a first annular surface, and a second annular surface. The first annular surface and the second annular surface are respectively connected to two opposite sides of the inner peripheral surface.

According to an embodiment of the present invention, the inner peripheral surface is the light-incident surface, and one of the first annular surface and the second annular surface is the light-emitting surface.

According to an embodiment of the present invention, the inner peripheral surface is the light-incident surface, and an optical coating is disposed on one of the first annular surface and the second annular surface.

According to an embodiment of the present invention, the inner peripheral surface is the light-incident surface, and the light guide plate further includes an outer peripheral surface opposite to the inner peripheral surface. An optical coating is disposed on the outer peripheral surface.

According to an embodiment of the present invention, the inner peripheral surface is the light-incident surface, and the light guide plate further includes an outer peripheral surface opposite to the inner peripheral surface, in which the outer peripheral surface is an inclined surface.

According to an embodiment of the present invention, the light guide plate further includes an outer peripheral surface opposite to the inner peripheral surface, and a peripheral edge of the lamp shade structure is separated from the outer peripheral surface of the light guide plate.

According to an embodiment of the present invention, the aforementioned lamp further includes a fixing assembly. The light guide plate, the light source and the lamp shade structure are disposed on the fixing assembly.

According to an embodiment of the present invention, the fixing assembly includes a first casing, a second casing and a supporting pillar. The second casing is connected to the first casing, and an accommodating space is formed between the second casing and the first casing. The light source and a portion the light guide plate which is near to the light-incident surface are located in the accommodating space. The supporting pillar is disposed on the first casing, in which the lamp shade structure is disposed on the supporting pillar, and the lamp shade structure covers the light guide plate and is separated from the light guide plate by a distance.

According to an embodiment of the present invention, the supporting pillar has a first end and a second end opposite to each other. The first end is connected to the first casing, and a flange is disposed on the second end. The lamp shade structure is disposed on the second end and is supported by the flange, in which an end cap covers the second end and is configured to position the lamp shade structure.

According to an embodiment of the present invention, the fixing assembly further includes a base which is connected to and supports the second casing.

According to an embodiment of the present invention, each of the supporting pillar and the end cap is a hollow structure which is configured to accommodate one end of a wire, and the other end of the wire is connected to a base of the fixing assembly.

According to the aforementioned embodiments of the present invention, the lamp shade structure of the present invention has plural light guide structures, and the light guide structures are formed on the main body to make the main body have different thicknesses. Therefore, different thicknesses of the main body can cause different degrees of light absorption and light transmission, which enables light passing through the lamp shade structure to generate different light colors with gradient light effect. Moreover, visual effect of the lamp shade structure varies with viewer's viewing angle. In addition, when the light passes through the light guide structures, the light guide structures can change traveling directions of the light, thereby preventing the generation of glare.

BRIEF DESCRIPTION OF THE DRAWINGS

The patent or application file contains at least one drawing executed in color. Copies of this patent or patent application publication with color drawing(s) will be provided by Office upon request and payment of the necessary fee. The invention can be more fully understood by reading the following detailed description of the embodiment, with reference made to the accompanying drawings as follows:

FIG. 5A is a photograph of a lamp that does not use any lamp shade structure when the lamp is turned on;

FIG. 5B is a photograph of a lamp that uses a lamp shade structure with uniform thickness when the lamp is turned on;

FIG. 5C is a photograph of a lamp that uses a lamp shade structure of the first embodiment when the lamp is turned on;

FIG. 8A is a photograph of a lamp that does not use any lamp shade structure when the lamp is turned on;

FIG. 8B is a photograph of a lamp that uses a lamp shade structure with uniform thickness when the lamp is turned on;

FIG. 8C is a photograph of a lamp that uses a lamp shade structure of the second embodiment when the lamp is turned on;

DETAILED DESCRIPTION

Figure 1:
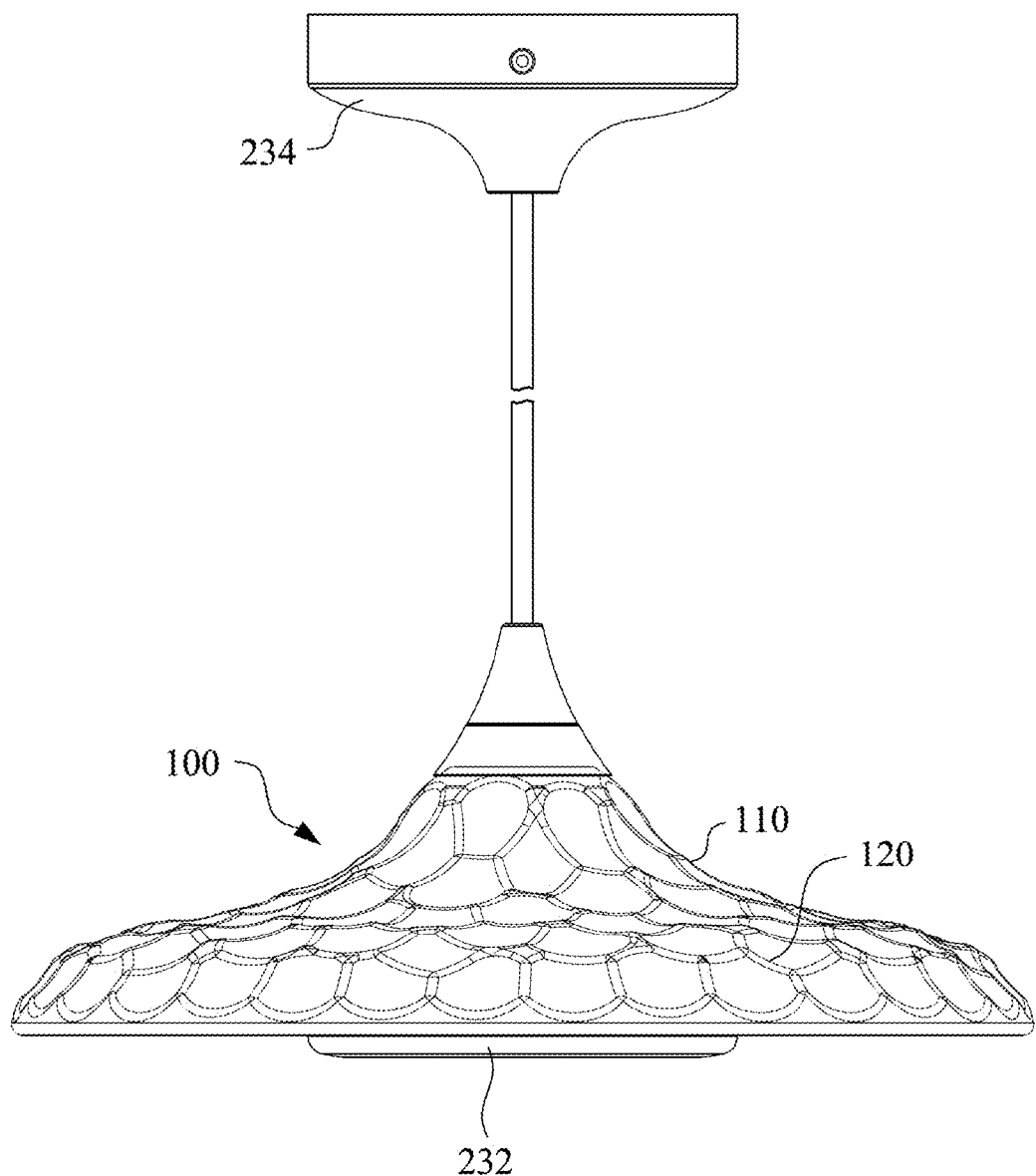
FIG. 1 is a schematic structural diagram showing a lamp in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
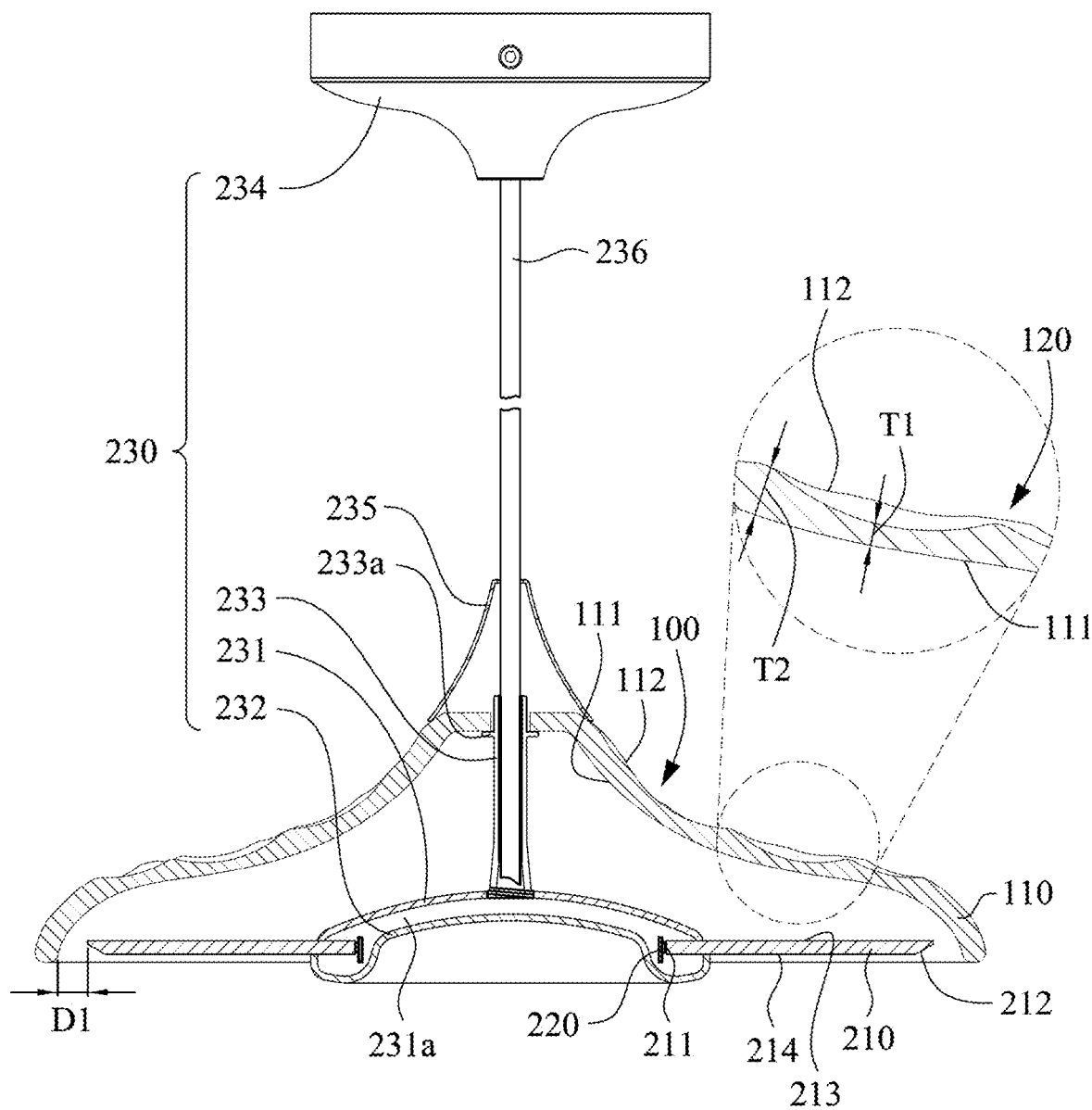
FIG. 2 is a partial cross-sectional view showing the lamp in accordance with the first embodiment of the present invention.

Referring to FIG. 1 and FIG. 2, FIG. 1 and FIG. 2 is a schematic structural diagram and a partial cross-sectional view showing a lamp 200 in accordance with a first embodiment of the present invention. The lamp 200 mainly includes a light guide plate 210, a light source 220, a lamp shade structure 100 and a fixing assembly 230. The light guide plate 210, the light source 220 and the lamp shade structure 100 are disposed on the fixing assembly 230. The light source 220 is mainly used to provide light to the light guide plate 210. The lamp shade structure 100 covers the light guide plate 210 and is able to refract and diffuse the light emitted from the light guide plate 210 so as to form a special optical effect.

Referring to FIG. 2 again, the fixing assembly 230 includes a first casing 231, a second casing 232, a supporting pillar 233 and a base 234. The first casing 231 is connected to the second casing 232, and an accommodating space 231a is formed between the first casing 231 and the second casing 232. Both of the light source 220 and the light guide plate 210 are annular structures, and the light source 220 and a portion of the light guide plate 210 which is near to a light-incident surface of the light guide plate 210 are located in the accommodating space 231a. The supporting pillar 233 has opposing first end and second end, in which the first end is disposed on the first casing 231, and a flange 233a is disposed on the second end. The lamp shade structure 100 is put around the second end of the supporting pillar 233 and is supported by the flange 233a, thereby covering the light guide plate 210. In one example, an end cap 235 is disposed on the second end of the supporting pillar 233, and the end cap 235 is used to position the lamp shade structure 100. In the present embodiment, each of the supporting pillar 233 and the end cap 235 is a hollow structure. One end of the wire 236 passes through and is fixed in the supporting pillar 233 and the end cap 235, and the other end of the wire 236 extends out of the supporting pillar 233 and the end cap 235 and is connected to the base 234. In the present embodiment, the lamp 200 is a suspension lamp, and the base 234 can be disposed on a ceiling or other predetermined locations.

Figure 3:
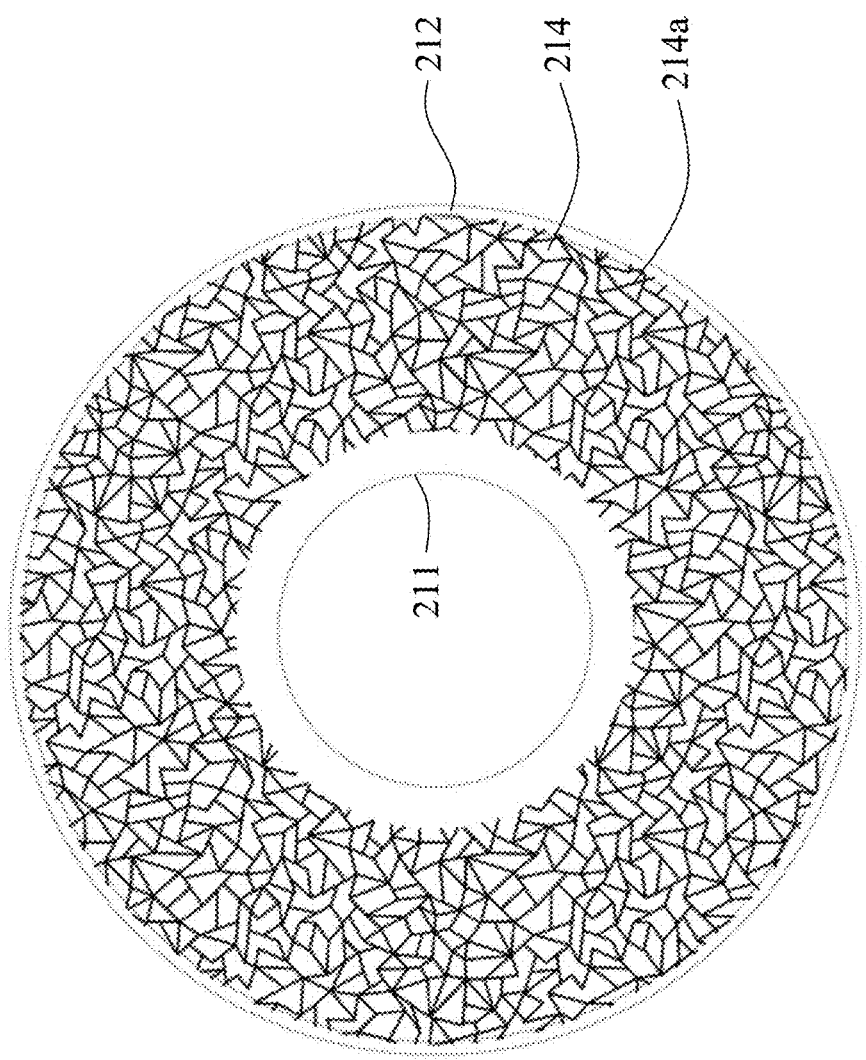
FIG. 3 is a top view showing a light guide plate in accordance with an embodiment of the present invention.
Figure 4:
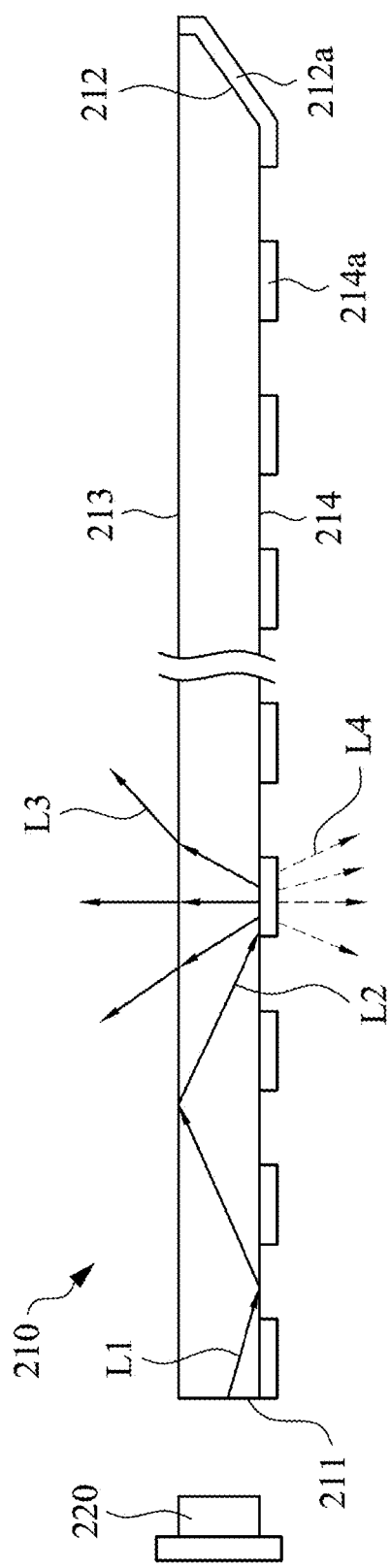
FIG. 4 is a schematic diagram showing light traveling in the light guide plate.

Referring to FIG. 3 and FIG. 4, FIG. 3 is a top view showing the light guide plate 210 in accordance with an embodiment of the present invention, and FIG. 4 is a schematic diagram showing light traveling in the light guide plate 210. As shown in FIG. 3, the light guide plate 210 includes an inner peripheral surface 211, an outer peripheral surface 212, a first annular surface 213 and a second annular surface 214. The inner peripheral surface 211 of the light guide plate 210 is the light-incident surface, and the light source 220 is disposed adjacent to the inner peripheral surface 211 of the light guide plate 210. In some examples, an optical coating 214a is disposed on the second annular surface 214. The optical coating 214a is mainly used to redirect light in a diffuse or controlled directional manner when the light escapes from the first annular surface 213 because it is no longer compliant with the rule of total internal reflection. As shown in FIG. 4, light beams (e.g. a light beam L1) provided by the light source 220 will be reflected when being emitted towards a portion of the second annular surface 214 on which no optical coating 214a is disposed. Most of the light beams emitted towards the optical coating 214a (e.g. light beam L2) are reflected by the optical coating 214a and further emit from the first annular surface 213 (e.g. light beam L3), and a small portion of the light beams (e.g. light beam L4) are diffused through the optical coating 214a. Therefore, when being viewed from the second annular surface 214, the portion of second annular surface 214 with the optical coating 214a appears to be brighter, and thus the optical coating 214a can be designed as a pattern disposed on a surface of the light guide plate 210, thereby obtaining the light guide plate 210 with different appearances and optical effects. In other examples, the optical coating 214a can also be disposed on the first annular surface 213 according to different requirements.

In other embodiments, the outer peripheral surface 212 of the light guide plate 210 can be designed as an inclined surface. In the present embodiment, an acute angle is formed between the outer peripheral surface 212 and the first annular surface 213. Therefore, after light emits to the outer peripheral surface 212, light can be directed towards and further emitted from the first annular surface 213. In other embodiments, an acute angle can be also formed between the outer peripheral surface 212 and the second annular surface 214, so as to change the direction of light reflection. Similarly, an optical coating 212a can be disposed on the outer peripheral surface 212 so as to change optical effect of the light guide plate 210. As shown in FIG. 2, in some embodiments, when the lamp shade structure 100 covers the light guide plate 210, a peripheral edge of the lamp shade structure 100 is separated from the outer peripheral surface 212 of the light guide plate 210 by a light-mixing distance D1. Therefore, light diffused from the outer peripheral surface 212 can be affected by the lamp shade structure 100 to form a halo effect.

Referring to FIG. 2 again, the lamp shade structure 100 mainly includes a main body 110 and plural light guide structures 120. The main body 110 has a concave surface 111 and an outer surface 112 opposite to the concave surface 111. In the present embodiment, the light guide structures 120 are disposed on the outer surface 112, and the concave surface 111 is a smooth surface. Each of the light guide structure 120 is recessed from the outer surface 112 toward the concave surface 111. Moreover, each of the light guide structures 120 has a central thickness T1 and a peripheral thickness T2, and the central thickness T1 is smaller than the peripheral thickness T2. Therefore, by using different thicknesses of the main body 110 to cause different degrees of light absorption and light transmission, different optical effects can be obtained while the light passes through the lamp shade structure 100.

More specifically, the main body 110 of the lamp shade structure 100 has a smaller thickness near a center portion of each of the light guide structures 120, and the main body 110 has a greater thickness near an edge position of each of the light guide structures 120. Moreover, portions of the main body 110 with smaller thickness have higher light transmission capability and lower energy absorbing capability, and portions of the main body 110 with higher thickness have lower light transmission capability and higher energy absorbing capability. Therefore, when light from different directions passes through different positions of the lamp shade structure 100, the traveling direction of the light and the intensity of the light are changed, thus resulting in a special optical effect.

Figure 5A:
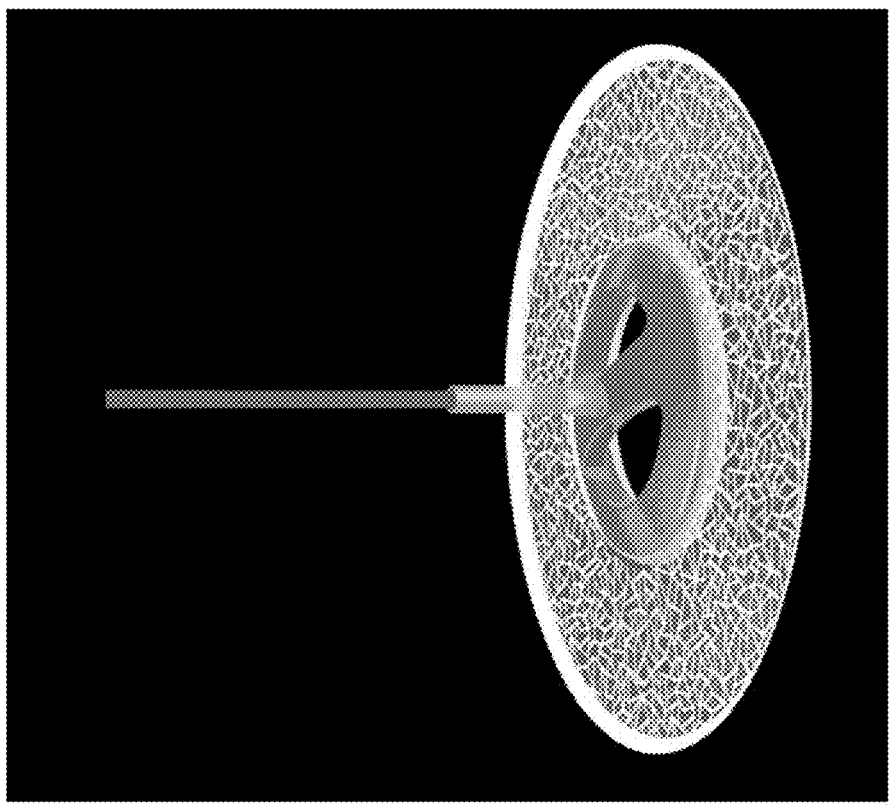
Figure 5B:
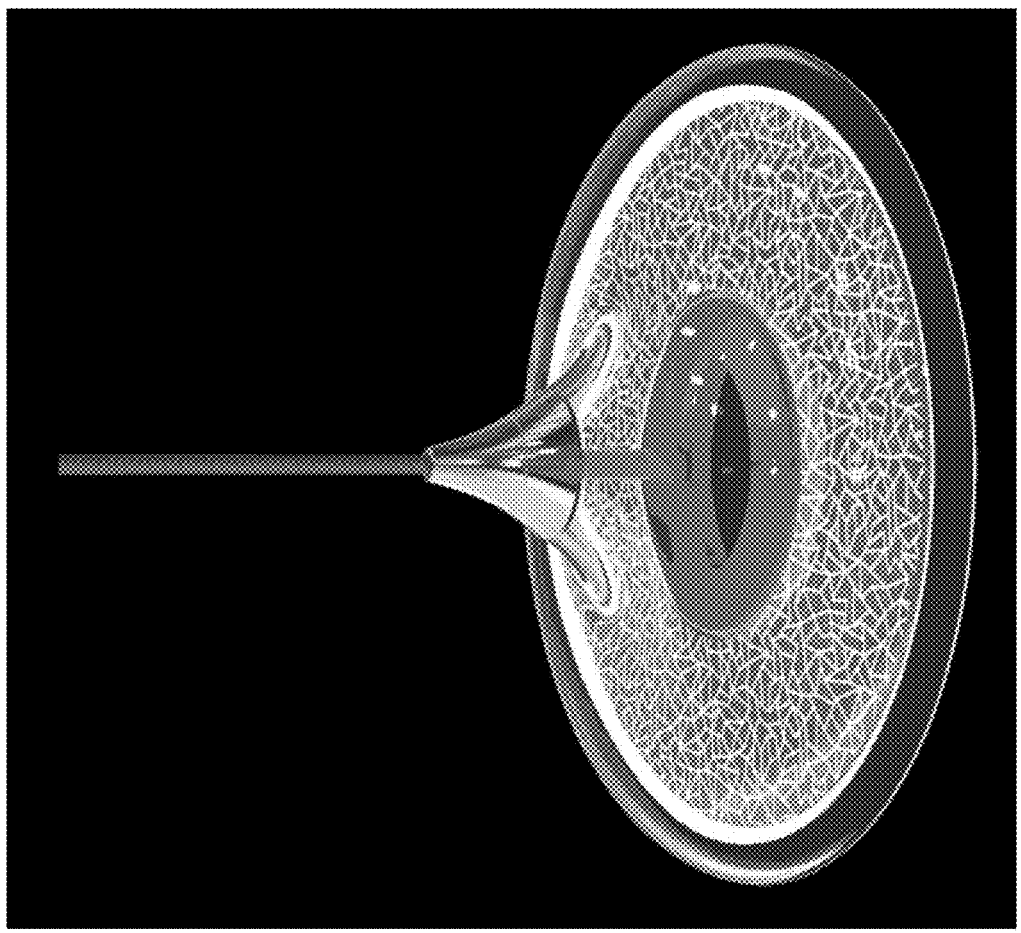
Figure 5C:
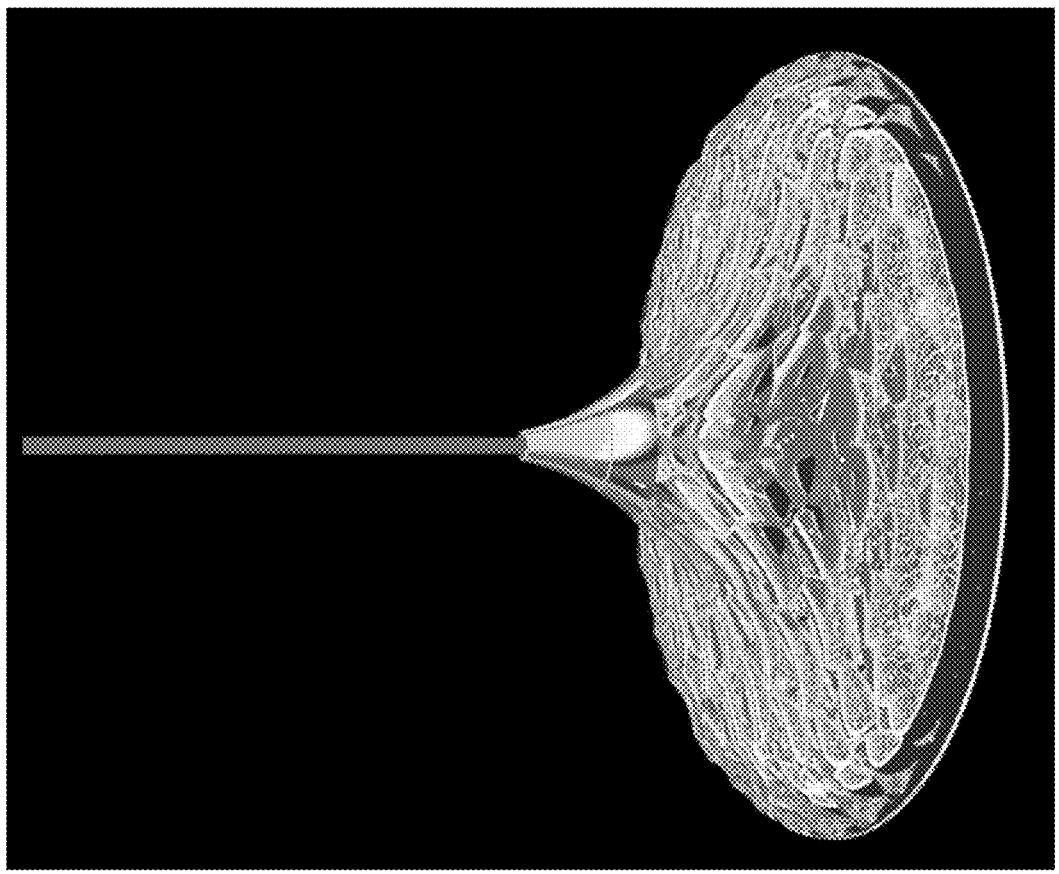
Figure 5D:
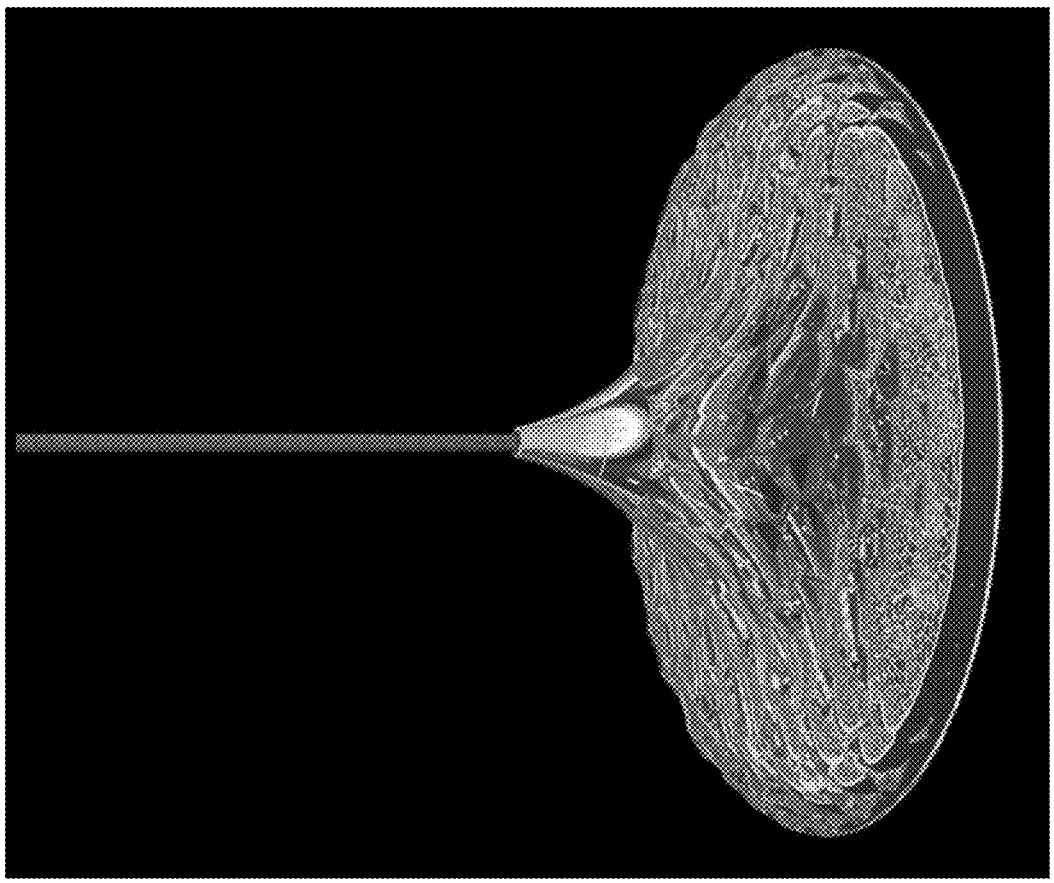
FIG. 5D is a photograph of the lamp that uses the lamp shade structure of the first embodiment when the lamp is turned off.

Referring to FIG. 5A-FIG. 5D, FIG. 5A is a photograph of a lamp that does not use any lamp shade structure when the lamp is turned on, FIG. 5B is a photograph of a lamp that uses a lamp shade structure with uniform thickness when the lamp is turned on, FIG. 5C is a photograph of a lamp that uses a lamp shade structure of the first embodiment when the lamp is turned on, and FIG. 5D is a photograph of the lamp that uses the lamp shade structure of the first embodiment when the lamp is turned off. As shown in FIG. 5A, when the lamp shade structure is not applied, only the light guide plate itself and the lighted pattern of the optical coating can be seen. As shown in FIG. 5B, when the lamp shade structure with uniform thickness is applied, although the light and shadow generated by the lamp are slightly changed, yet the overall light and shadow performance generated by the lamp and the texture of lamp shade structure are monotonous, and the light still generates glare after passing through the lamp shade structure with uniform thickness.

As shown in FIG. 5C, after the lamp shade structure of the first embodiment is applied, the lamp shade structure with different thicknesses can refract, absorb, or diffuse a portion of light, thus not only preventing the generation of light glare but also forming a light gradation effect. In addition, due to the different thicknesses of the lamp shade structure, different visual light colors on the lamp shade structure will be generated. For example, as shown in the photograph of FIG. 5C, after light generated by a yellow light source passes through the light guide plate and is emitted from the lamp shade structure, dark yellow shadow as well as light yellow shadow will generated on the surface of the lamp shade structure. As shown in FIG. 5D, when the lamp is turned off, the lamp shade with different thicknesses can also refract a small amount of external natural light, thereby enhancing the stereoscopic effect of the texture of the lamp shade structure.

Figure 6:
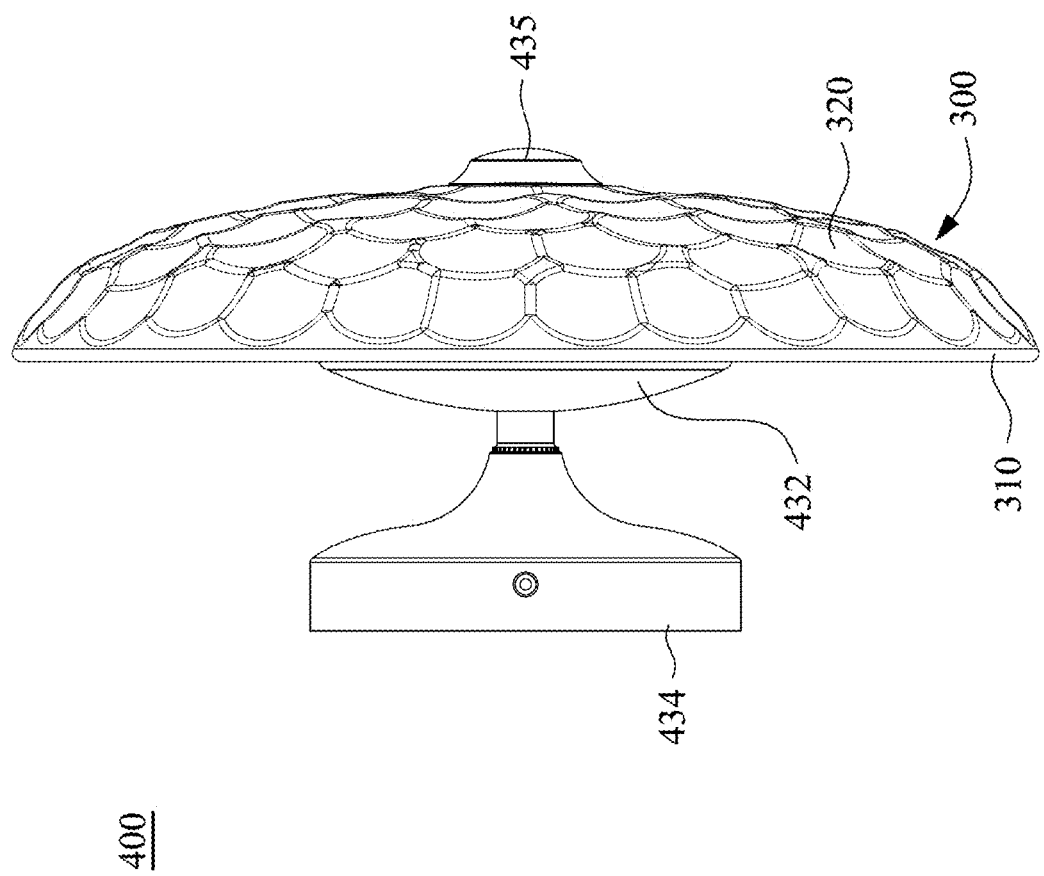
FIG. 6 is a schematic structural diagram showing a lamp in accordance with a second embodiment of the present invention.
Figure 7:
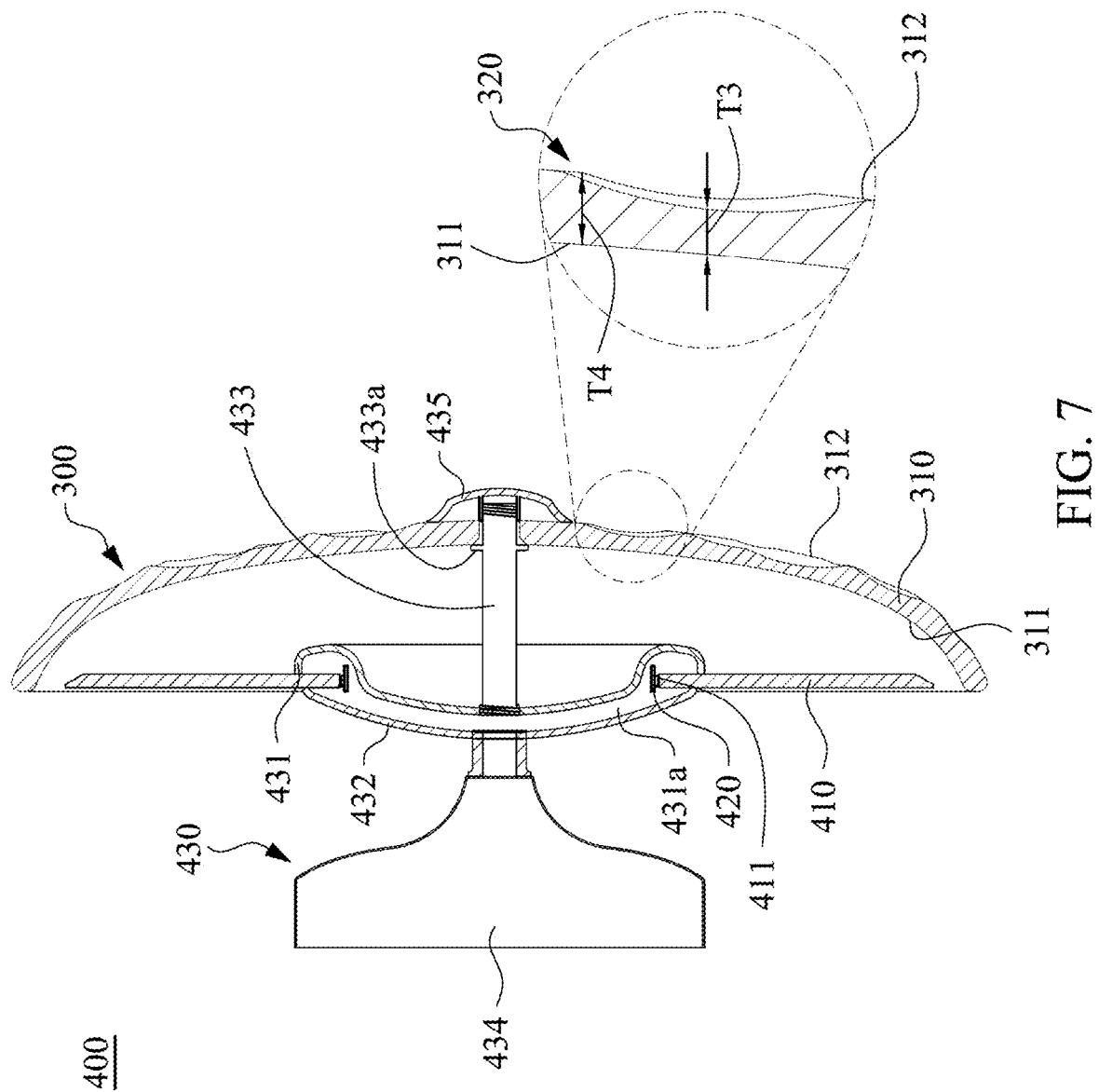
FIG. 7 is a partial cross-sectional view showing the lamp in accordance with the second embodiment of the present invention.

It is noted that, the lamp of the present disclosure can be a wall lamp. Simultaneously referring to FIG. 6 and FIG. 7, FIG. 6 and FIG. 7 are a schematic structural diagram and a partial cross-sectional view respectively showing a lamp 400 in accordance with a second embodiment of the present invention. The lamp 400 mainly includes a light guide plate 410, a light source 420, a lamp shade structure 300 and a fixing assembly 430. The light guide plate 410, the light source 420 and the lamp shade structure 300 are disposed on the fixing assembly 430. As shown in FIG. 7, the fixing assembly 430 includes a first casing 431, a second casing 432, a supporting pillar 433 and a base 434. The first casing 431 is connected to the second casing 432, and an accommodating space 431a is formed between the first casing 431 and the second casing 432. Each of the light source 420 and the light guide plate 410 is an annular structure, and the light source 420 and a portion of the light guide plate 410 which is near to the light-incident surface 411 are located in the accommodating space 431a. The supporting pillar 433 has opposing first end and second end. The first end is disposed on the first casing 431, and a flange 433a is disposed on the second end. The lamp shade structure 300 is disposed on the second end of the supporting pillar 433 and is abutted against the flange 433a, thereby covering the light guide plate 410. In one example, an end cap 435 is disposed on the second end of the supporting pillar 433 so as to position the lamp shade structure 300. In the present embodiment, the lamp 400 is a wall lamp, the second casing 432 is directly fixed on the base 434, and the base 434 can be fixed on the wall or other required locations.

In the present embodiment, the design of the light guide plate 410 is similar to the design of the light guide plate 210 in FIG. 2-FIG. 4, and therefore will not be described again herein.

Referring to FIG. 7 again, in the present embodiment, the lamp shade structure 300 mainly includes a main body 310 and plural light guide structures 320. The main body 310 has a concave surface 311 and an outer surface 312 opposite to the concave surface 311. In the present embodiment, the light guide structures 320 are disposed on the outer surface 312, and the concave surface 311 is a smooth surface. Each of the light guide structures 320 is recessed from the outer surface 312 toward the concave surface 311. Moreover, each of the light guide structures 320 has a central thickness T3 and a peripheral thickness T4, and the central thickness T3 is smaller than the peripheral thickness T4. Therefore, by using different thicknesses of the main body 310 to cause different degrees of light absorption and light transmission, different optical effects can be obtained while the light passes through the lamp shade structure 300.

Figure 8A:
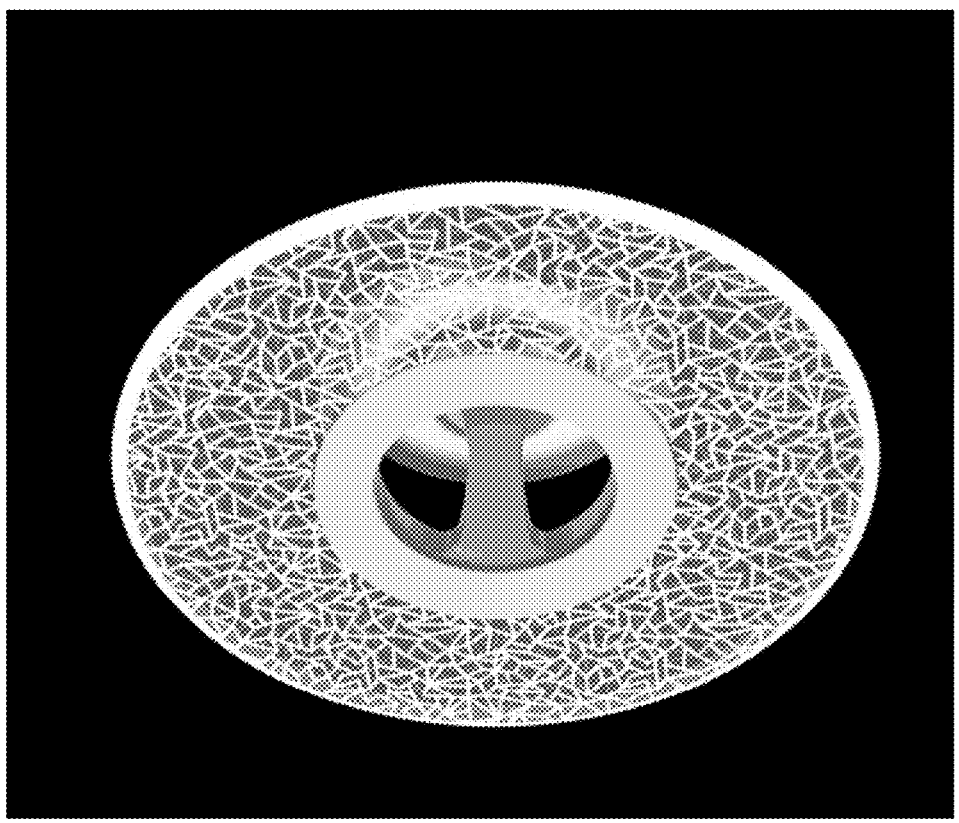
Figure 8B:
Figure 8C:
Figure 8D:
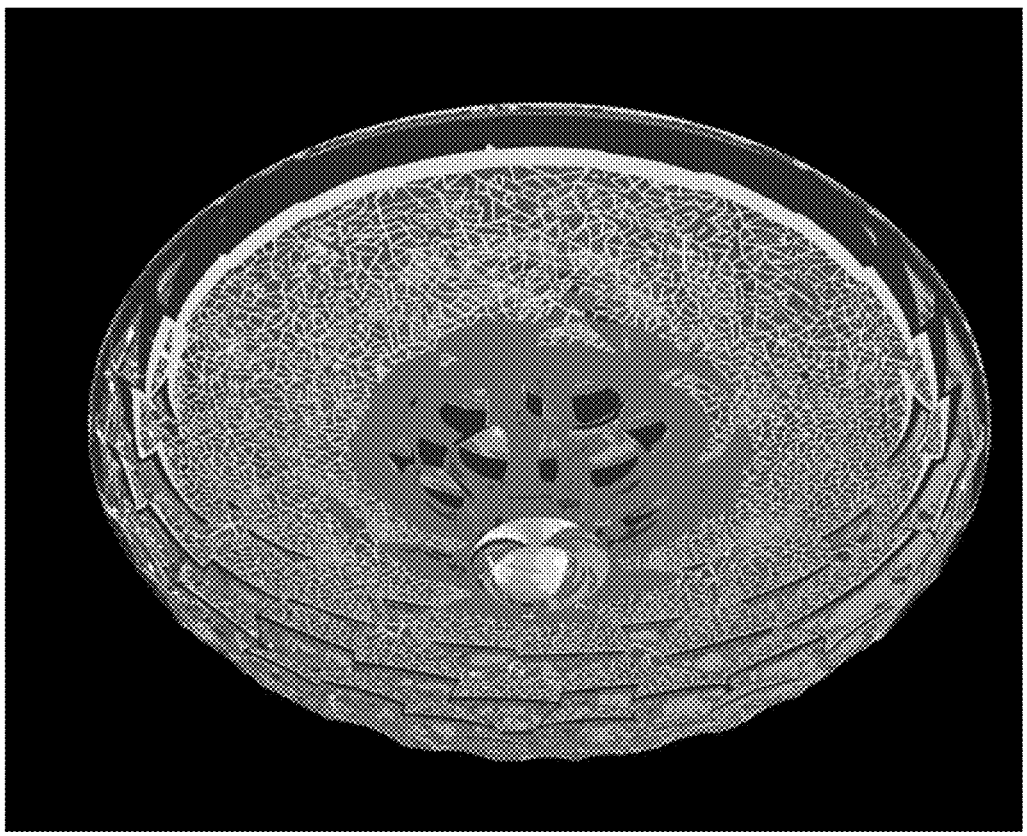
FIG. 8D is a photograph of the lamp that uses the lamp shade structure of the second embodiment when the lamp is turned off.

Referring to FIG. 8A-FIG. 8D, FIG. 8A is a photograph of a lamp that does not use any lamp shade structure when the lamp is turned on, FIG. 8B is a photograph of a lamp that uses a lamp shade structure with uniform thickness when the lamp is turned on, FIG. 8C is a photograph of a lamp that uses a lamp shade structure of the second embodiment when the lamp is turned on, and FIG. 8D is a photograph of the lamp that uses the lamp shade structure of the second embodiment when the lamp is turned off. As shown in FIG. 8A, when the lamp shade structure is not applied, only the light guide plate itself and the lighted pattern of the optical coating can be seen. As shown in FIG. 8B, when the lamp shade structure with uniform thickness is applied, although the light and shadow generated by the lamp are slightly changed, yet the overall light and shadow performance generated by the lamp and the texture of lamp shade structure are monotonous, and the light still generates glare after passing through the lamp shade structure with uniform thickness.

As shown in FIG. 8C, after the lamp shade structure of the second embodiment is applied, the lamp shade structure with different thicknesses can refract, absorb, or diffuse a portion of light, thus not only preventing the generation of light glare but also forming a light gradation effect. In addition, due to the different thicknesses of the lamp shade structure, different visual light colors on the lamp shade structure will also be generated. For example, as shown in the photograph of FIG. 8C, after light generated by a yellow light source passes through the light guide plate and is emitted from the lamp shade structure, dark yellow shadow as well as light yellow shadow will generated on the surface of the lamp shade structure. As shown in FIG. 8D, when the lamp is turned off, the lamp shade with different thicknesses can also refract a small amount of external natural light, thereby enhancing the stereoscopic effect of the texture of the lamp shade structure.

Figure 9:
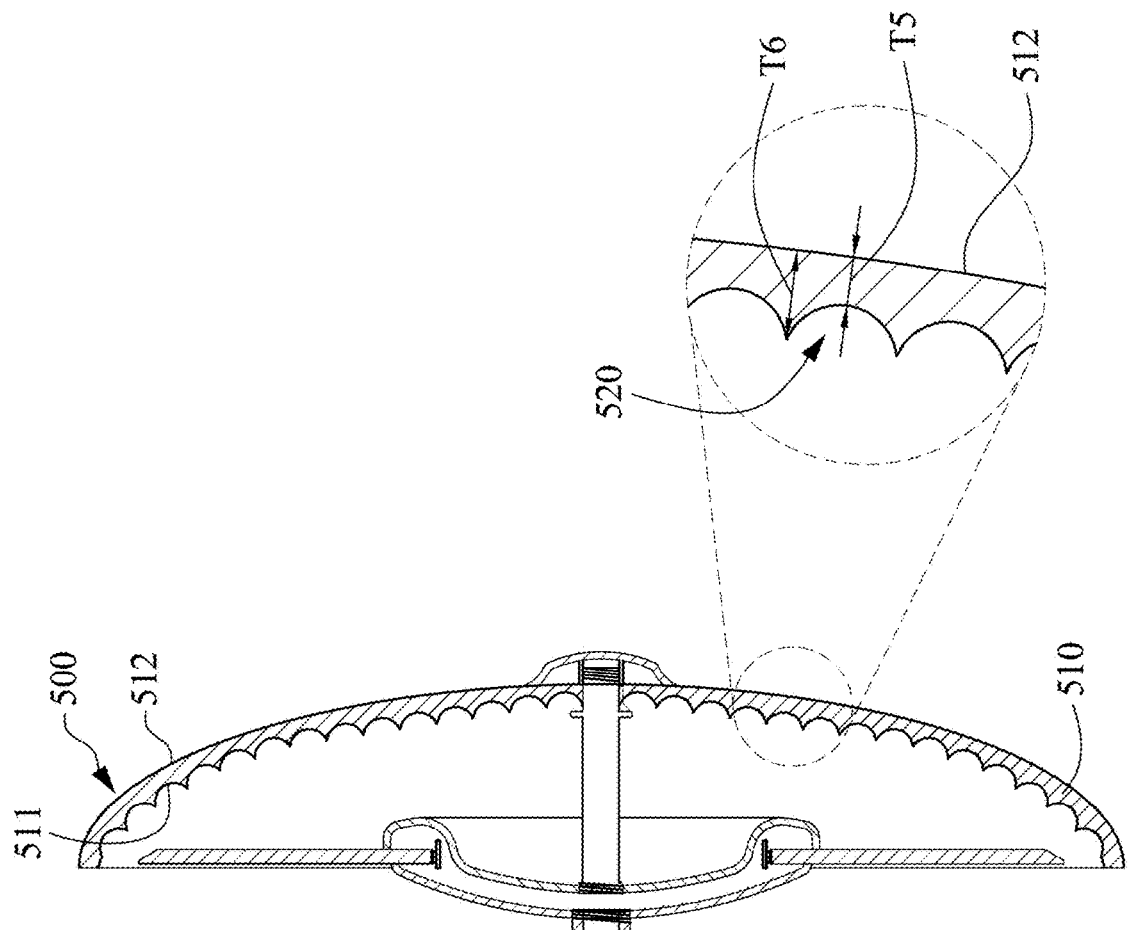
FIG. 9 is a schematic structural diagram showing a lamp in accordance with a third embodiment of the present invention.

Referring to FIG. 9, FIG. 9 is a schematic structural diagram showing a lamp 600 in accordance with a third embodiment of the present invention. The structure of the lamp 600 is similar to that of the lamp 400 shown in FIG. 7, and the main difference therebetween is that a lamp shade structure 500 of the lamp 600 has different designs. As shown in FIG. 9, the lamp shade structure 500 mainly includes a main body 510 and plural light guide structures 520. The main body 510 has a concave surface 511 and an outer surface 512 opposite to the concave surface 511. In the present embodiment, the light guide structures 520 are disposed on the concave surface 511, and the outer surface 512 is a smooth surface. In the present embodiment, each of the light guide structures 520 is a recessed structure which is recessed from the concave surface 511 toward the outer surface 512. Moreover, each of the light guide structures 520 has a central thickness T5 and a peripheral thickness T6, and the central thickness T5 is smaller than the peripheral thickness T6. Therefore, by using different thicknesses of the main body 510 to cause different degrees of light absorption and light transmission, different optical effects can be obtained while the light passes through the lamp shade structure 500.

According to the aforementioned embodiments of the present invention, the lamp shade structure of the present invention has plural light guide structures, and the light guide structures are formed on the main body to make the main body have different thicknesses. Therefore, different thicknesses of the main body can result in different levels of light absorption and transmittance, which enables light passing through the lamp shade structure to generate different light colors with gradient light effect. Moreover, visual effect of the lamp shade structure varies with viewer's viewing angle. In addition, when the light passes through the light guide structures, the light guide structures can change traveling directions of the light, thereby preventing the generation of glare.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lamp shade structure, comprising:
a main body having a concave surface and an outer surface opposite to the concave surface; and
a plurality of light guide structures disposed on the concave surface or the outer surface, wherein each of the light guide structures has a central thickness and a peripheral thickness, and the central thickness is smaller than the peripheral thickness.

2. The lamp shade structure of claim 1, wherein the light guide structures are disposed on the outer surface, and each of the light guide structures is a recessed structure which is recessed from the outer surface toward the concave surface.

3. The lamp shade structure of claim 1, wherein the light guide structures are disposed on the concave surface, and each of the light guide structures is a recessed structure which is recessed from the concave surface toward the outer surface.

4. A lamp, comprising:
a light guide plate having a light-incident surface and a light-emitting surface;
a light source disposed adjacent to the light-incident surface; and
a lamp shade structure as claimed in claim 1 covering the light guide plate.

5. The lamp of claim 4, wherein the light guide plate is an annular structure, and the light guide plate has an inner peripheral surface, a first annular surface, and a second annular surface, wherein the first annular surface and the second annular surface are respectively connected to two opposite sides of the inner peripheral surface.

6. The lamp of claim 5, wherein the inner peripheral surface is the light-incident surface, and one of the first annular surface and the second annular surface is the light-emitting surface.

7. The lamp of claim 5, wherein the inner peripheral surface is the light-incident surface, and an optical coating is disposed on one of the first annular surface and the second annular surface.

8. The lamp of claim 5, wherein the inner peripheral surface is the light-incident surface, and the light guide plate further comprises an outer peripheral surface opposite to the inner peripheral surface, wherein an optical coating is disposed on the outer peripheral surface.

9. The lamp of claim 5, wherein the inner peripheral surface is the light-incident surface, and the light guide plate further comprises an outer peripheral surface opposite to the inner peripheral surface, wherein the outer peripheral surface is an inclined surface.

10. The lamp of claim 5, wherein the light guide plate further comprises an outer peripheral surface opposite to the inner peripheral surface, and a peripheral edge of the lamp shade structure is separated from the outer peripheral surface of the light guide plate.

11. The lamp of claim 4, further comprising a fixing assembly, wherein the light guide plate, the light source and the lamp shade structure are disposed on the fixing assembly.

12. The lamp of claim 11, wherein the fixing assembly comprises:
   a first casing;
   a second casing connected to the first casing, and an accommodating space is formed between the second casing and the first casing, wherein the light source and a portion the light guide plate which is near to the light-incident surface are located in the accommodating space; and
   a supporting pillar disposed on the first casing, wherein the lamp shade structure is disposed on the supporting pillar, and the lamp shade structure covers the light guide plate and is separated from the light guide plate by a distance.

13. The lamp of claim 12, wherein the supporting pillar has a first end and a second end opposite to each other, and the first end is connected to the first casing, and a flange is disposed on the second end, and the lamp shade structure is disposed on the second end and is supported by the flange, wherein an end cap covers the second end and is configured to position the lamp shade structure.

14. The lamp of claim 13, wherein the fixing assembly further comprises a base which is connected to and supports the second casing.

15. The lamp of claim 13, wherein each of the supporting pillar and the end cap is a hollow structure which is configured to accommodate one end of a wire, and the other end of the wire is connected to a base of the fixing assembly.

* * * * *